(12) United States Patent
Ishii

(10) Patent No.: US 7,999,822 B2
(45) Date of Patent: Aug. 16, 2011

(54) COLOR PROCESSING APPARATUS AND METHOD THEREOF

(75) Inventor: Toshiyuki Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 747 days.

(21) Appl. No.: 12/108,033

(22) Filed: Apr. 23, 2008

(65) Prior Publication Data

US 2008/0266313 A1 Oct. 30, 2008

(30) Foreign Application Priority Data

Apr. 26, 2007 (JP) ................. 2007-117622

(51) Int. Cl.
*G09G 5/00* (2006.01)
*G09G 5/02* (2006.01)
*H04N 1/46* (2006.01)
*H04N 1/60* (2006.01)
*H04N 5/57* (2006.01)
*G03F 3/08* (2006.01)
*G06K 9/00* (2006.01)
*H04N 17/00* (2006.01)
*H04N 9/73* (2006.01)
*H04N 5/202* (2006.01)
*G06K 9/40* (2006.01)
*G06K 9/32* (2006.01)
*G01J 3/00* (2006.01)
*G01J 3/52* (2006.01)

(52) U.S. Cl. ........ 345/589; 345/600; 345/606; 345/619; 345/549; 348/180; 348/227; 348/254; 348/602; 358/504; 358/518; 358/523; 358/525; 382/167; 382/254; 382/274; 382/300; 356/300; 356/421

(58) Field of Classification Search .................. 345/581, 345/589–593, 600–602, 606, 618–619, 522, 345/549, 690, 77, 63; 348/68, 180, 223, 348/227, 254–256, 366, 557, 671–675, 602, 348/687; 358/504, 509, 516–518, 523–525; 382/162–167; 356/300–303, 451, 402, 421, 356/213

See application file for complete search history.

(56) References Cited

U.S. PATENT DOCUMENTS

| 5,502,799 | A  | * | 3/1996 | Tsuji et al. ................... 345/600 |
| 5,929,906 | A  | * | 7/1999 | Arai et al. ................... 348/223.1 |
| 7,027,067 | B1 |   | 4/2006 | Ohga |
| 2002/0135768 | A1 | * | 9/2002 | Sugiyama et al. ........... 356/405 |
| 2005/0083346 | A1 | * | 4/2005 | Takahashi et al. ........... 345/600 |
| 2005/0094871 | A1 | * | 5/2005 | Berns et al. .................... 382/162 |
| 2005/0275911 | A1 | * | 12/2005 | Yamada et al. .............. 358/518 |
| 2006/0285742 | A1 | * | 12/2006 | Arai et al. .................... 382/162 |

FOREIGN PATENT DOCUMENTS

JP 2006-200960 8/2006

* cited by examiner

*Primary Examiner* — Wesner Sajous
(74) *Attorney, Agent, or Firm* — Cowan, Liebowitz & Latman, P.C.

(57) ABSTRACT

In order to obtain colorimetric data close to the color appearance under an actual viewing condition, a plurality of conversion data for converting colorimetric data measured under the first geometric condition of colorimetry into that measured under the second geometric condition of colorimetry are held, and the information of a viewing illuminant and colorimetric data measured under the first geometric condition of colorimetry are obtained. Conversion data which corresponds to the information of the viewing illuminant is interpolated from the plurality of conversion data which are held. The colorimetric data measured under the first geometric condition of colorimetry is converted into that measured under the second geometric condition of colorimetry using the interpolated conversion data.

14 Claims, 18 Drawing Sheets

FIG. 6

| 729 (NUMBER OF MEASURED COLORS) ||||||
|---|---|---|---|---|---|
| R | G | B | Xi | Yi | Zi |
| 0 | 0 | 0 | 0.52 | 0.55 | 0.59 |
| 0 | 0 | 32 | 0.88 | 0.95 | 0.98 |
| 0 | 0 | 64 | 5.59 | 6.12 | 7.12 |
| 0 | 0 | 96 | 8.88 | 9.25 | 11.2 |
| 0 | 0 | 128 | 9.61 | 10.5 | 12.3 |
| ⋮ | ⋮ | ⋮ | ⋮ | ⋮ | ⋮ |
| 255 | 255 | 224 | 77.8 | 84.5 | 76.7 |
| 255 | 255 | 255 | 82.1 | 86.3 | 99.7 |

FIG. 7

| REFERENCE ILLUMINANT A (COLOR TEMPERATURE : 2556K) | | | |
|---|---|---|---|
| MATRIX COEFFICIENT | | | |
| m11: 1.0344 | m12: -0.0343 | m13: -0.0275 | m14: 1.8301 |
| m21: 0.0094 | m22: 0.9938 | m23: -0.0375 | m24: 1.6388 |
| m31: -0.0082 | m32: 0.0019 | m33: 1.0509 | m34: 0.5888 |

| REFERENCE ILLUMINANT D50 (COLOR TEMPERATURE : 5000K) | | | |
|---|---|---|---|
| MATRIX COEFFICIENT | | | |
| m11: 0.9853 | m12: -0.0328 | m13: -0.0021 | m14: 0.8991 |
| m21: 0.0248 | m22: 0.9287 | m23: -0.0141 | m24: 0.9424 |
| m31: -0.0019 | m32: 0.0004 | m33: 0.9937 | m34: 0.8361 |

| REFERENCE ILLUMINANT D65 (COLOR TEMPERATURE :6500K) | | | |
|---|---|---|---|
| MATRIX COEFFICIENT | | | |
| m11: 0.9716 | m12: -0.0196 | m13: -0.0024 | m14: 0.9641 |
| m21: 0.0086 | m22: 0.9462 | m23: -0.0103 | m24: 1.0176 |
| m31: -0.0222 | m32: 0.0165 | m33: 1.0062 | m34: 1.1564 |

| ILLUMINANT NAME | COLOR TEMPERATURE INFORMATION |
|---|---|
| N-EDL | (X X X X K) |
| L-EDL | (X X X X K) |
| D-SDL | (X X X X K) |
| N-SDL | (X X X X K) |
| EX-WW | (X X X X K) |
| EX-W | (X X X X K) |
| D50 | (X X X X K) |
| ⋮ | ⋮ |

FIG. 15

| GLOSSY PAPER 1 (GLOSSINESS: 30) | | | |
|---|---|---|---|
| MATRIX COEFFICIENT | | | |
| m11: 0.9465 | m12: -0.0163 | m13: -0.0057 | m14: 4.2687 |
| m21: 0.0324 | m22: 0.8903 | m23: -0.0125 | m24: 4.2997 |
| m31: -0.0421 | m32: 0.0540 | m33: 0.9243 | m34: 3.5033 |

| GLOSSY PAPER 2 (GLOSSINESS: 20) | | | |
|---|---|---|---|
| MATRIX COEFFICIENT | | | |
| m11: 0.9585 | m12: -0.0315 | m13: -0.0071 | m14: 4.0373 |
| m21: 0.0322 | m22: 0.8925 | m23: -0.0141 | m24: 4.0502 |
| m31: -0.0232 | m32: 0.0297 | m33: 0.9217 | m34: 3.0284 |

| MATTE PAPER (GLOSSINESS: 0) | | | |
|---|---|---|---|
| MATRIX COEFFICIENT | | | |
| m11: 1.0260 | m12: -0.0873 | m13: -0.0146 | m14: 3.7670 |
| m21: 0.0331 | m22: 0.9066 | m23: -0.0250 | m24: 3.8044 |
| m31: -0.0102 | m32: 0.0278 | m33: 0.9932 | m34: 3.4800 |

| MEDIUM NAME | GLOSSINESS |
|---|---|
| GLOSSY PAPER 1 | (XXXX) |
| GLOSSY PAPER 2 | (XXXX) |
| PLAIN PAPER | (XXXX) |
| SEMIGLOSS PAPER 1 | (XXXX) |
| SEMIGLOSS PAPER 2 | (XXXX) |
| MATTE PAPER | (XXXX) |
| ⋮ | ⋮ |

COLOR PROCESSING APPARATUS AND METHOD THEREOF

BACKGROUND OF THE INVENTION

1. Field of the Invention

The present invention relates to color processing for calculating colorimetric data under a given viewing condition.

2. Description of the Related Art

As a technique of uniformly managing the color gamuts and color reproduction characteristics of a plurality of different devices and accurately transferring them, a color management system (to be abbreviated as CMS hereinafter) is known. In order to manage the color reproduction characteristics of respective devices, a CMS outputs the color reproduction characteristic data of the respective devices, for example, predetermined color patches in the case of a printer, and uses a device profile which describes the data obtained by colorimetrically measuring the color patches, thereby implementing color management. In order to generate a device profile, colorimetry using a spectral radiancemeter or spectrophotometer is necessary to obtain the color reproduction characteristic data of the respective devices.

The feature of colorimetry by a spectrophotometer and that of colorimetry by a spectral radiancemeter are described now.

FIG. 1 is a view schematically illustrating colorimetry by a spectrophotometer 15. In colorimetry by the spectrophotometer 15, a sample 11 (e.g., a color patch) is irradiated with light from a specific direction, and the light reflected in a specific direction is measured. In such colorimetry, since the geometric condition of an illuminant 13 and that of a photoreceptor 12 can be fixed, it is possible to place the illuminant 13 and photoreceptor 12 in a relatively small colorimetry unit 10 and cause the colorimetry unit 10 to scan, so as to colorimetrically measure many samples 11 in an automatic manner.

Colorimetry by the spectrophotometer 15 is contact type colorimetry, so it is advantageously simple. However, since light is measured under a specific geometric condition, the color appearance of the sample 11 under the actual viewing condition of an observer cannot be colorimetrically measured with high accuracy.

FIG. 2 is a view schematically illustrating colorimetry by a spectral radiancemeter 14. In colorimetry by the spectral radiancemeter 14, the position of the radiancemeter can be adjusted in accordance with the actual viewing condition (geometric condition) of the observer. Accordingly, while light from a plurality of illuminants 13 is scattering, it is possible to measure the light reflected from the sample 11 to the light-receiving direction of the observer. That is, it is possible to obtain a colorimetric value close to the color appearance of the sample 11 under the actual viewing condition of the observer.

The spectral radiancemeter 14 has the advantage of being capable of colorimetrically measuring the color appearance under a viewing condition with a high accuracy. However, since the spectral radiancemeter 14 is large compared to the spectrophotometer 15, it is not suitable for automatic colorimetry and requires a long colorimetry time. Even if a device capable of automatic colorimetry is available, since it requires a certain period of time to integrate colorimetric light, requires aligning the sample with the device in accordance the viewing condition (geometric condition), and the like, it still requires a long colorimetry time compared to the spectrophotometer 15.

As described above, in colorimetry by a spectrophotometer, the color appearance under an actual viewing condition cannot be colorimetrically measured with a high accuracy. On the other hand, colorimetry by a spectral radiancemeter requires a long colorimetry time. That is, it is difficult to colorimetrically measure the color appearance under an actual viewing condition with a high accuracy and easily in a short period of time.

Japanese Patent Laid-Open No. 2006-200960 discloses a means for solving this problem. A technique disclosed in Japanese Patent Laid-Open No. 2006-200960 corrects a colorimetric value under the first viewing condition to that under the second viewing condition. First, a white plate is colorimetrically measured under the first and second viewing conditions. Then, data for correcting a colorimetric value is generated from spectral distribution, the components of which vary depending on the viewing condition. By using this correction data, it is possible to calculate colorimetric data to be obtained upon colorimetry by a spectral radiancemeter in an environment close to the actual viewing condition, from the colorimetric data of a spectrophotometer. Accordingly, a time required for colorimetry decreases, and highly accurate colorimetric data which is close to that viewed under the actual viewing condition is obtained.

In the technique disclosed in Japanese Patent Laid-Open No. 2006-200960, however, it is necessary to generate correction data for converting the colorimetric data of the spectrophotometer into that of the spectral radiancemeter for respective actual viewing conditions. In other words, conversion of colorimetric data is possible only for the viewing condition for which correction data is generated. That is, when correction data for a new viewing condition is required, generation (colorimetry) of new correction data is necessary.

In addition, even if correction data for various viewing conditions are generated and a mechanism to hold them is prepared, it is impractical to cover all viewing conditions since correction data are different depending on the viewing conditions (the type of illuminant, geometric condition, media characteristics, color material characteristics, or the like).

Of course, an expensive spectral radiancemeter is necessary to generate correction data, and therefore it is impractical to generate correction data in a general user environment.

SUMMARY OF THE INVENTION

In one aspect, a color processing apparatus comprises: a holding section, arranged to hold a plurality of conversion data for converting colorimetric data measured under a first geometric condition of colorimetry into colorimetric data measured under a second geometric condition of colorimetry; a first obtaining section, arranged to obtain information of a viewing illuminant; a second obtaining section, arranged to obtain the colorimetric data measured under the first geometric condition of colorimetry; an interpolator, arranged to interpolate conversion data which corresponds to the information of the viewing illuminant from the plurality of conversion data held by the holding section; and a converter, arranged to convert the colorimetric data measured under the first geometric condition of colorimetry and obtained by the first obtaining section into the colorimetric data measured under the second geometric condition of colorimetry, using the interpolated conversion data.

According to the aspect, colorimetric data close to the color appearance under an actual viewing condition can be obtained.

Further features of the present invention will become apparent from the following description of exemplary embodiments with reference to the attached drawings.

BRIEF DESCRIPTION OF THE DRAWINGS

FIG. 6 is a view showing examples of the format of colorimetric value;

FIG. 7 is a view showing the examples of conversion data held by a conversion data holding unit;

FIG. 9 is a view showing an example of an illuminant correspondence table held by an illuminant table holding unit;

FIG. 15 is a view showing the examples of conversion data held by a conversion data holding unit;

FIG. 17 is a view showing an example of a correspondence table held by a gloss character table holding unit.

DESCRIPTION OF THE EMBODIMENTS

Color processing of embodiments according to the present invention will be described below in detail with reference to the accompanying drawings.

First Embodiment

[Arrangement of Apparatus]

Figure 1:
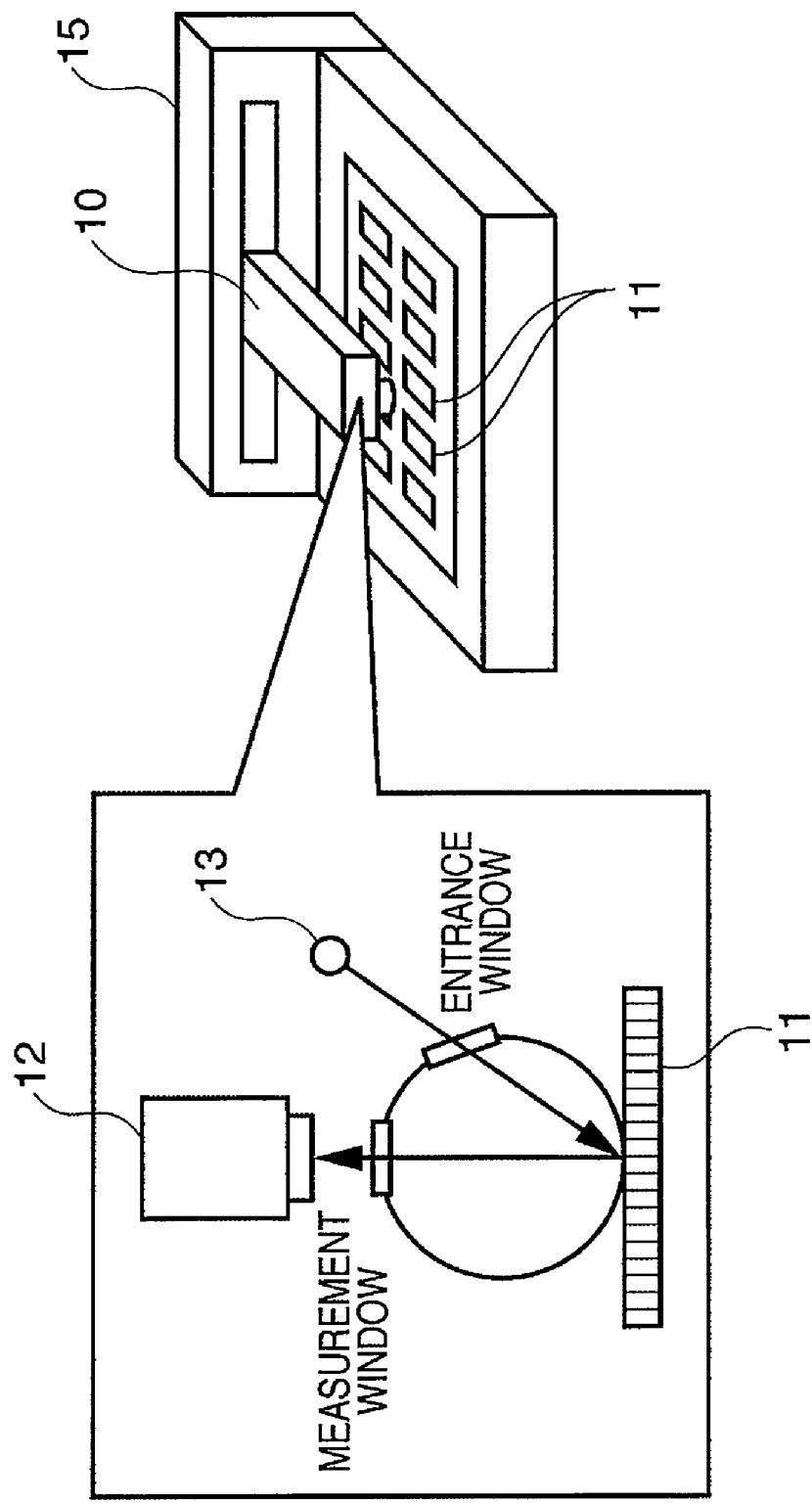
FIG. 1 is a view schematically illustrating colorimetry by a spectrophotometer.
Figure 2:
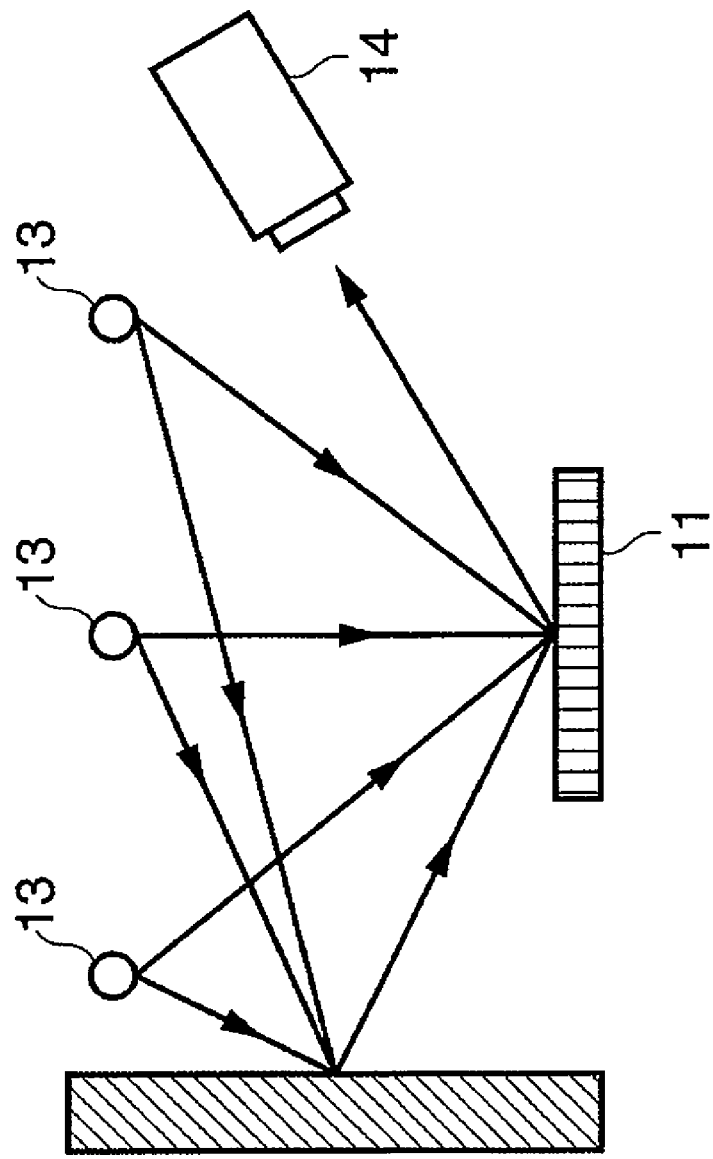
FIG. 2 is a view schematically illustrating colorimetry by a spectral radiancemeter.
Figure 3:
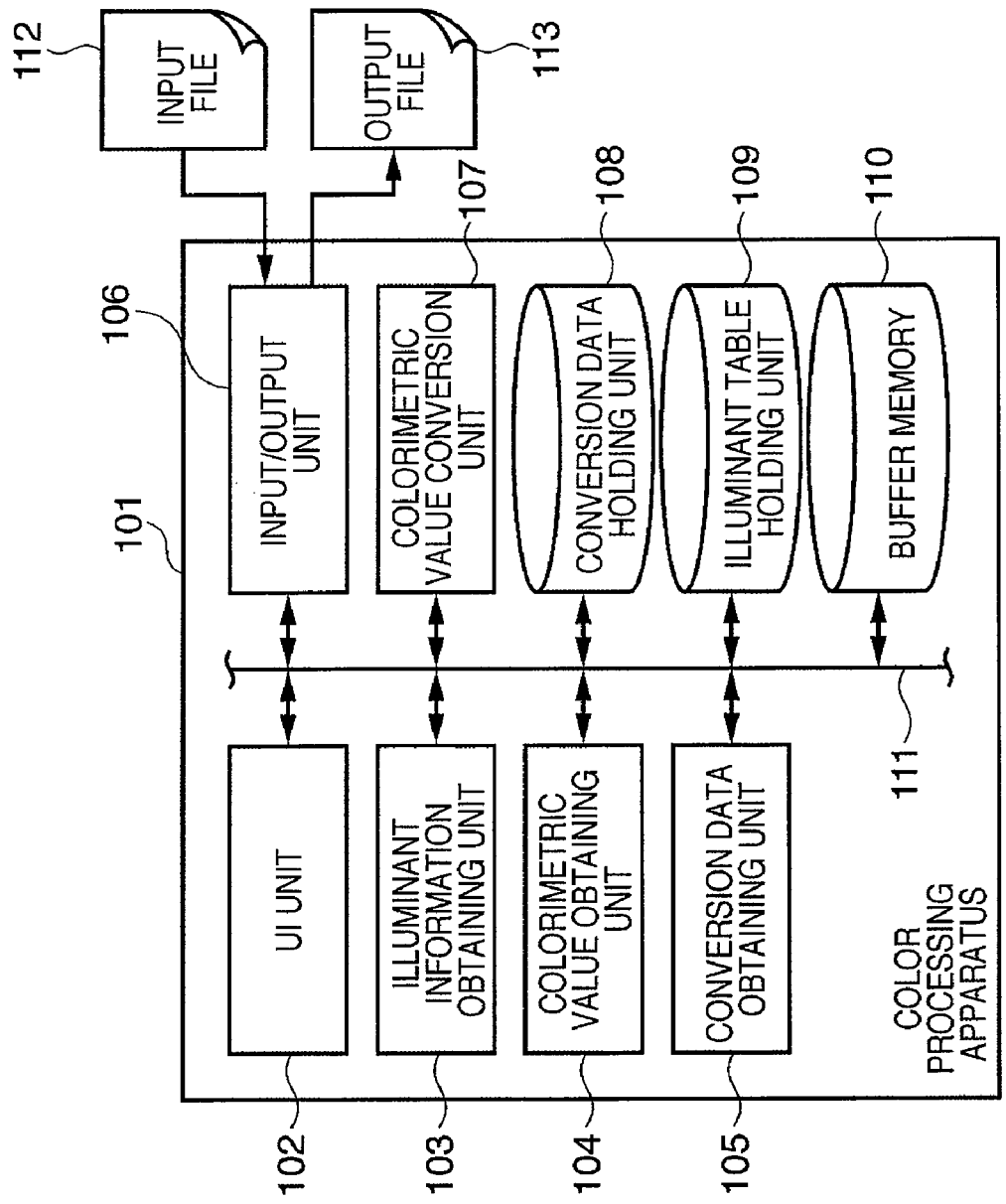
FIG. 3 is a block diagram showing the arrangement of a color processing apparatus of the first embodiment.

FIG. 3 is a block diagram showing the arrangement of a color processing apparatus 101 of this embodiment.

A user interface (UI) unit 102 provides a user interface for a user to designate a viewing condition, an input file 112, and an output file 113. That is, the UI unit 102 provides a video interface for displaying a graphical user interface (GUI) on a monitor (not shown) or the like, and an input interface of a pointing device such as a keyboard, mouse, touch panel, dial, or the like (not shown).

An illuminant information obtaining unit 103 obtains the color temperature information of a viewing illuminant designated by the user from an illuminant table holding unit 109. The illuminant table holding unit 109 holds a table which describes the correspondence between an illuminant name and color temperature information.

A colorimetric value obtaining unit 104 obtains measurement data (colorimetric value) of a spectrophotometer from the input file 112 designated by the user.

A conversion data obtaining unit 105 obtains conversion data corresponding to the viewing illuminant designated by the user, from a plurality of conversion data held by a conversion data holding unit 108. The conversion data holding unit 108 holds a plurality of conversion data corresponding to reference illuminants.

A colorimetric value conversion unit 107 converts the colorimetric value obtained by the colorimetric value obtaining unit 104, that is, the colorimetric data measured by the spectrophotometer, by using the conversion data obtained by the conversion data obtaining unit 105. A buffer memory 110 is a work memory used for processing in the color processing apparatus 101 and temporarily stores information being processed or an operation result.

An input/output unit 106 obtains the colorimetric value requested by the colorimetric value obtaining unit 104 from the input file 112, and outputs the output file 113 which describes the colorimetric value converted by the colorimetric value conversion unit 107 in a predetermined format, in accordance with a user's instruction. The input/output unit 106 connects to a serial bus such as a USB (Universal Serial Bus) or IEEE1394 or a network. Therefore, it is possible to input/output data to/from a computer apparatus or image input/output apparatus (e.g., a digital camera, scanner, printer, or the like) to perform a color matching process, or to/from a storage device or server device.

The respective components described above are connected to each other via a system bus 111.

[Operation of Apparatus]

Figure 4:
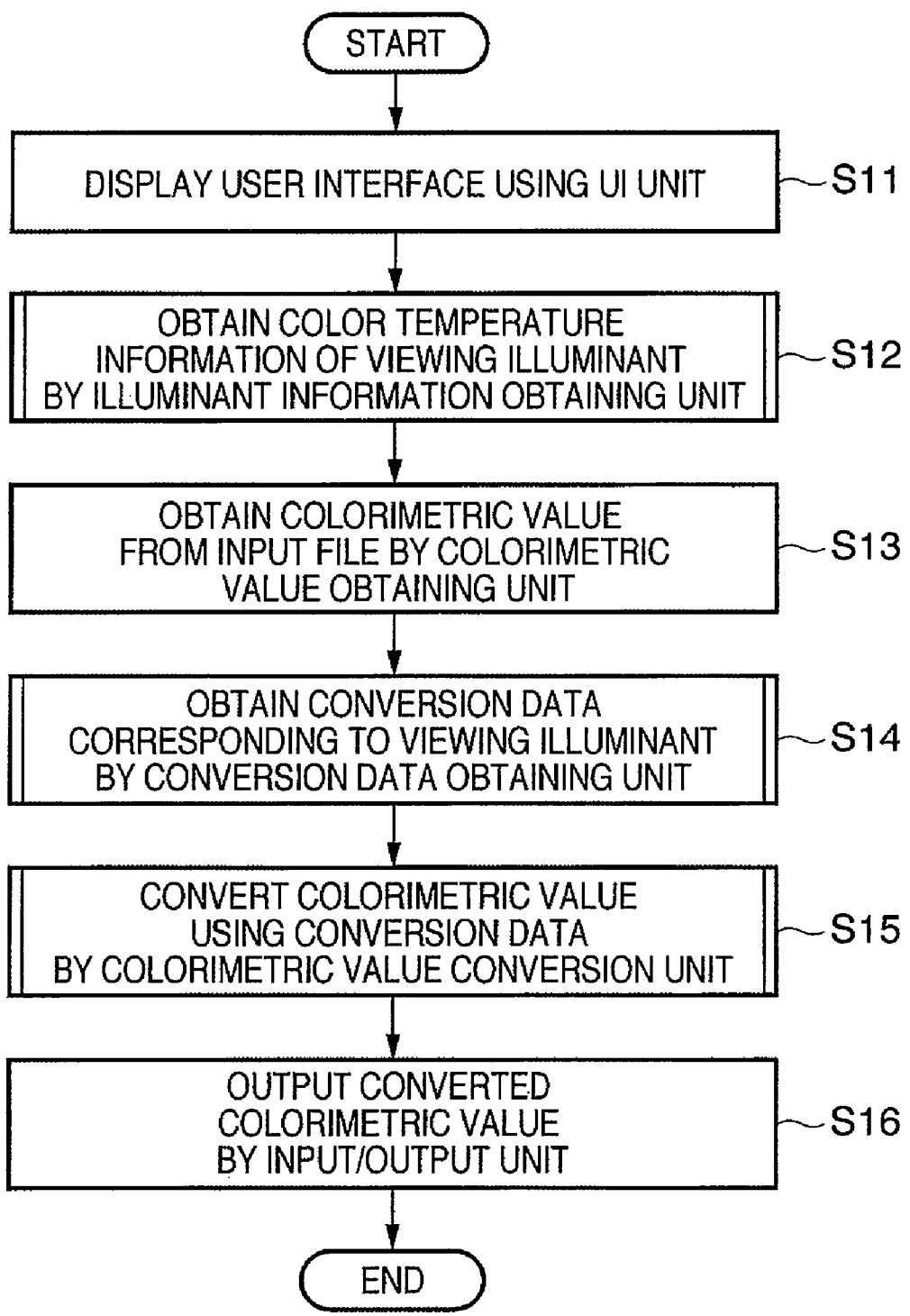
FIG. 4 is a flowchart illustrating the process of the color processing apparatus.

FIG. 4 is a flowchart illustrating the process of the color processing apparatus 101.

The UI unit 102 displays a user interface for a user to input information required to convert a colorimetric value on a monitor (S11).

Figure 5:
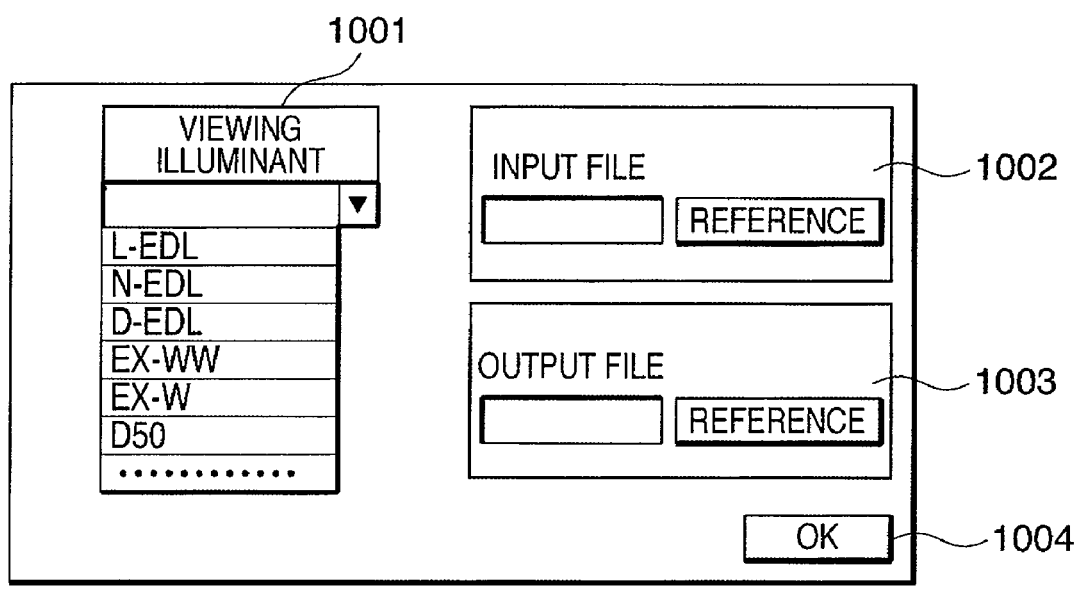
FIG. 5 is a view illustrating an example of a user interface.

FIG. 5 is a view illustrating an example of the user interface. The user interface includes a viewing illuminant setting section 1001 for inputting or selecting a name or symbol representing the type of a viewing illuminant. The user interface also includes an input file setting section 1002 for inputting or selecting the file name or path name (input destination) of the input file 112 which describes colorimetric values to be converted. Furthermore, the user interface includes an output file setting section 1003 for inputting or setting the file name or path name (output destination) of the output file 113 which describes colorimetric values as the conversion result.

The user uses a keyboard, mouse, or the like to manipulate the pull-down menu of the viewing illuminant setting section 1001 or to set file names in the input file setting section 1002 and output file setting section 1003. When input of required instructions (user's instructions) is complete, the user presses an OK button 1004. Note that light color symbols of typical illuminants defined by Japanese Industrial Standards (JIS), or the symbols of reference illuminants and supplementary reference illuminants such as A, C, and D illuminants defined by Commission Internationale de l'Eclairage (CIE) are set in the pull-down menu of the viewing illuminant setting section 1001.

The illuminant information obtaining unit 103 obtains the color temperature information of the viewing illuminant from the illuminant table holding unit 109 based on the name or symbol of the viewing illuminant set in the viewing illuminant setting section 1001 by the user, and stores it in a predetermined area of the buffer memory 110 (S12).

The colorimetric value obtaining unit 104 obtains a colorimetric value (a CIEXYZ value calculated from the spectral reflectance by the spectrophotometer) from the input file 112 set in the input file setting section 1002 by the user, through the input/output unit 106 (S13). The colorimetric value obtaining unit 104 stores the obtained colorimetric value in a predetermined area of the buffer memory 110.

FIG. 6 is a view showing the examples of the format of colorimetric value, in which the correspondence relationship between grid points (RGB values) obtained by uniformly dividing an RGB color space and XYZ values is described. Note that FIG. 6 shows an example of a 9-step grid pattern, but the number of grid points and that of measured colors are in no way limited.

The conversion data obtaining unit 105 obtains conversion data from the conversion data holding unit 108 based on the color temperature information obtained by the illuminant information obtaining unit 103 (S14).

FIG. 7 is a view showing the examples of conversion data held by the conversion data holding unit 108. The conversion data holding unit 108 holds the color temperature information and conversion data for each of a plurality of reference illuminants. The conversion data includes matrix coefficients for a matrix operation which converts the measurement data of the spectrophotometer into that of the spectral radiancemeter.

Note that the processing of the conversion data obtaining unit 105 and the method of generating the conversion data held by the conversion data holding unit 108 will be described later.

The colorimetric value conversion unit 107 converts the colorimetric value stored in the buffer memory 110 by the colorimetric value obtaining unit 104, by using the conversion data obtained by the conversion data obtaining unit 105 (S15), as will be described in detail later. The input/output unit 106 describes the colorimetric value converted by the colorimetric value conversion unit 107 in the output file 113 in a predetermined format and outputs the output file 113 in accordance with the setting in the output file setting section 1003 (S16).

Illuminant Information Obtaining Unit

Figure 8:
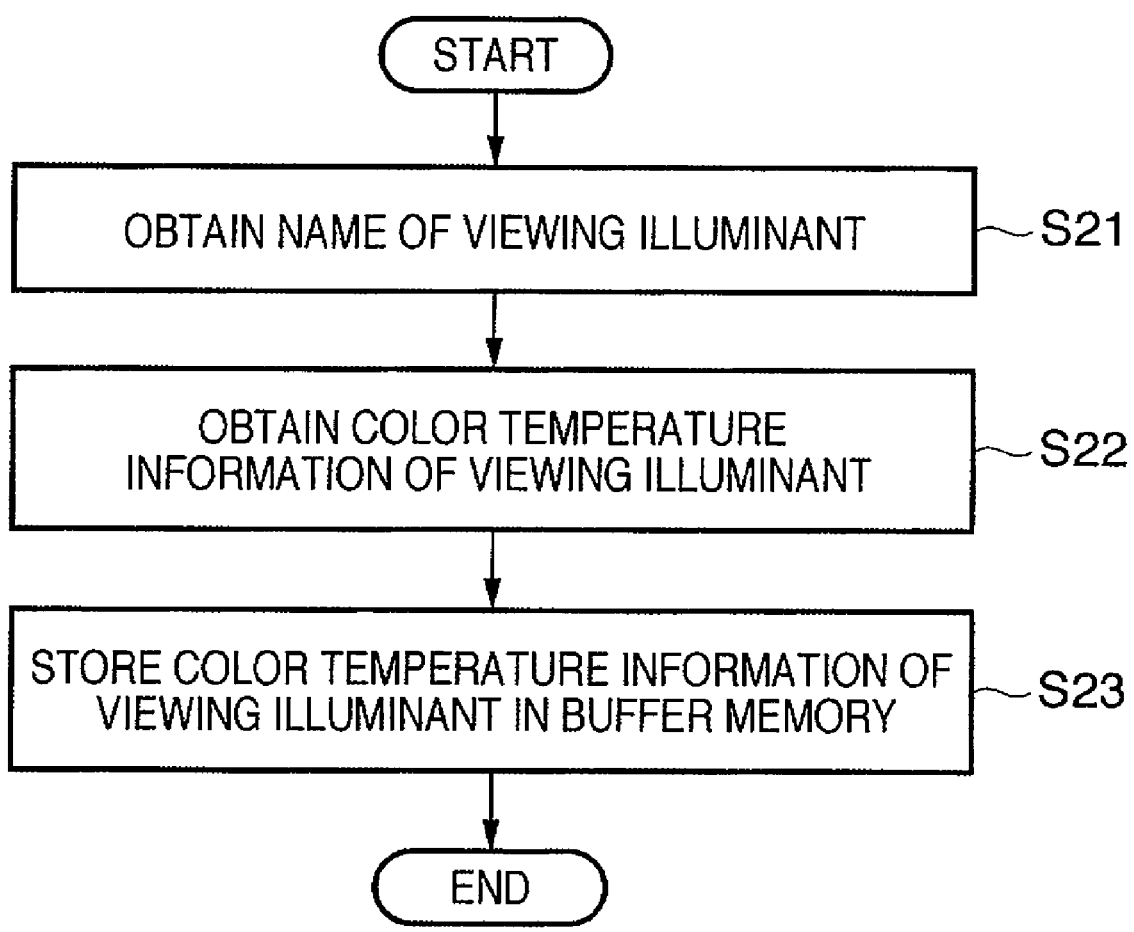
FIG. 8 is a flowchart for explaining the operation of an illuminant information obtaining unit.

FIG. 8 is a flowchart for explaining the operation (S12) of the illuminant information obtaining unit 103.

When the OK button 1004 shown in FIG. 5 is pressed, the illuminant information obtaining unit 103 obtains the name or symbol of the viewing illuminant set in the viewing illuminant setting section 1001 (S21). The illuminant information obtaining unit 103 then obtains the color temperature information corresponding to the name or symbol of the viewing illuminant from an illuminant correspondence table held in the illuminant table holding unit 109 (S22).

FIG. 9 is a view showing an example of the illuminant correspondence table held by the illuminant table holding unit 109. The illuminant correspondence table describes the color temperature information corresponding to the name or symbol of each illuminant listed in the pull-down menu of the viewing illuminant setting section 1001.

The illuminant information obtaining unit 103 then stores the obtained color temperature information of the viewing illuminant in a predetermined area of the buffer memory 110 (S23).

Conversion Data Obtaining Unit

Before explaining the operation of the conversion data obtaining unit 105, the method of generating the conversion data will be described.

The conversion data associates the measurement data (to be referred to as spectral reflectance data, hereinafter) of the spectrophotometer with the measurement data (to be referred to as spectral radiance data, hereinafter) of the spectral radiancemeter. In order to do this, from the spectral reflectance data and spectral radiance data as the measurement results of a plurality of samples (e.g., color patches) and by using the least-squares method or the like, matrix coefficients (conversion data) are obtained for the matrix operation, and are expressed by:

$$\begin{bmatrix} Xn \\ Yn \\ Zn \end{bmatrix} = \begin{bmatrix} m11 & m12 & m13 & m14 \\ m21 & m22 & m23 & m24 \\ m31 & m32 & m33 & m34 \end{bmatrix} \begin{bmatrix} Xi \\ Yi \\ Zi \end{bmatrix} \quad (1)$$

wherein Xn, Yn, and Zn represent the tristimulus values calculated from the spectral radiance data, and Xi, Yi, and Zi represent the tristimulus values calculated from the spectral reflectance data.

When the tristimulus values calculated from the spectral reflectance data are converted using the matrix operation expressed by equation (1), tristimulus values which consider the geometric condition of colorimetry by the spectral radiancemeter can be obtained. Note that equation (1) expresses the matrix operation using three rows and four columns, but the number of columns is in no way limited.

The spectral reflectance data and spectral radiance data of samples are measured under representative viewing conditions serving as standards, and conversion data which correspond to the respective viewing conditions as standards are generated. The generated conversion data are held in the conversion data holding unit 108.

Figure 10:
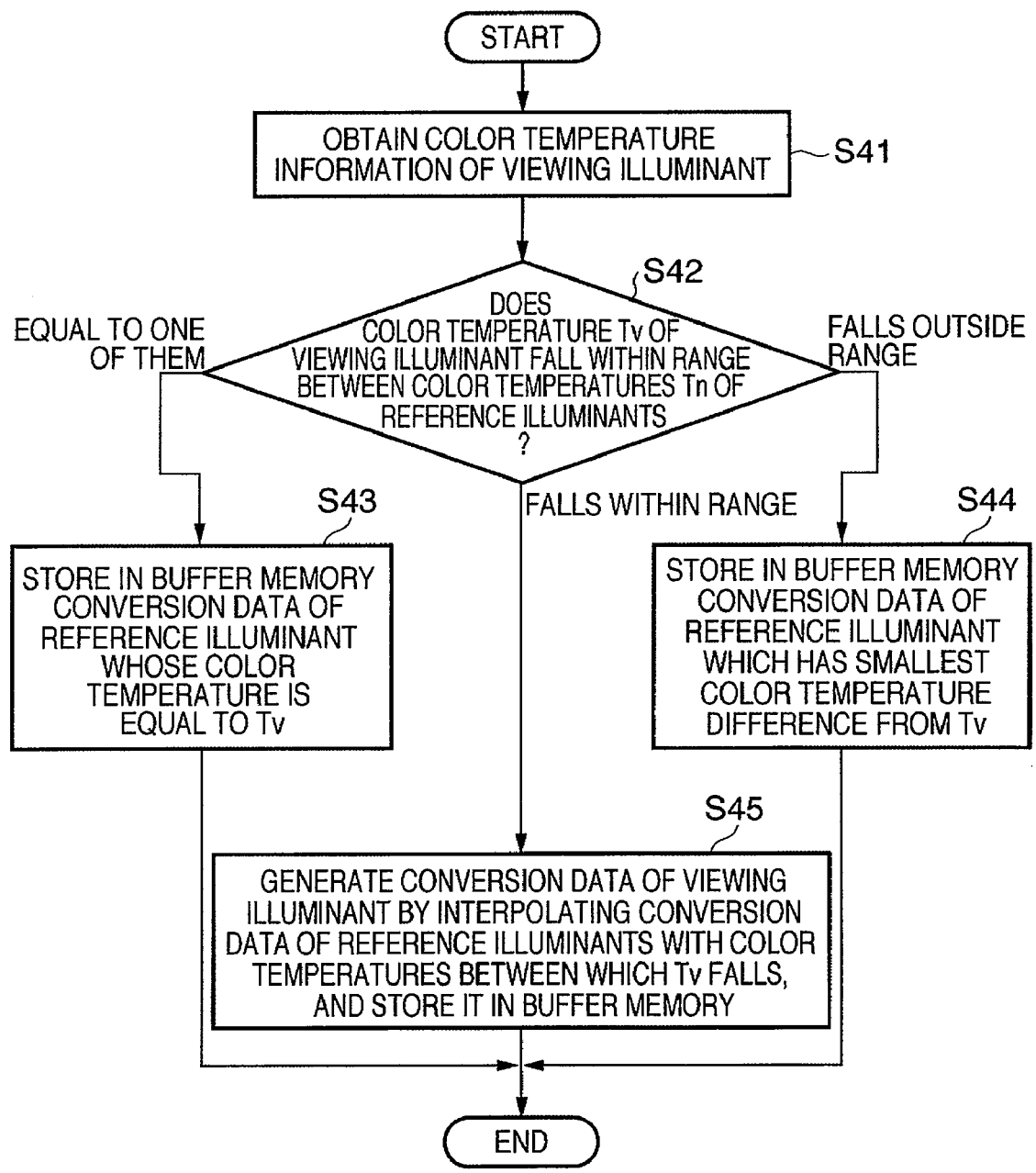
FIG. 10 is a flowchart for explaining the operation of a conversion data obtaining unit.

FIG. 10 is a flowchart for explaining the operation (S14) of the conversion data obtaining unit 105.

The conversion data obtaining unit 105 obtains the color temperature information of the viewing illuminant from the buffer memory 110 (S41). The conversion data obtaining unit 105 compares a color temperature Tv of the viewing illuminant with a color temperature Tn of the reference illuminant of the conversion data held by the conversion data holding unit 108, thereby branching the processing (S42).

When there is a reference illuminant whose color temperature is equal to the color temperature Tv of the viewing illuminant (Tv=Tn, i.e., Tv is equal to the color temperature of one of the reference illuminants), the conversion data obtaining unit 105 stores the conversion data of that reference illuminant in a predetermined area of the buffer memory 110 (S43). In the example shown in FIG. 7, when the color temperature Tv of the viewing illuminant is 6,500K, the conversion data obtaining unit 105 obtains the conversion data of a reference illuminant D65 (6,500K).

When there is no reference illuminant whose color temperature is equal to the color temperature Tv of the viewing illuminant but there are two reference illuminants having color temperatures Tn1 and Tn2, respectively, between which the color temperature Tv falls, the conversion data obtaining unit 105 advances the process to step S45. That is, Tn1<Tv<Tn2 holds in this case, and this is called "within the range" hereinafter.

There may be neither a reference illuminant with a color temperature equal to the color temperature Tv of the viewing illuminant nor reference illuminants with color temperatures between which the color temperature Tv falls. That is, Tv<Tn or Tn<Tv holds in this case, and this is called "outside the range" hereinafter. In this case, the conversion data obtaining unit 105 obtains the conversion data of a reference illuminant whose color temperature is closest to the color temperature Tv, and stores it in a predetermined area of the buffer memory 110 (S44). In the example shown in FIG. 7, when Tv=2500K, the conversion data obtaining unit 105 obtains the conversion data of a reference illuminant A (2,556K).

When there are reference illuminants having the color temperatures Tn1 and Tn2, respectively, between which the color temperature Tv falls, the conversion data obtaining unit 105 interpolates conversion data by using the linear sum of color temperatures expressed by equation (2) below, based on the color temperature Tv of the viewing illuminant and the color temperatures Tn1 and Tn2 of the reference illuminants. The conversion data obtaining unit 105 then stores the conversion data under the viewing illuminant as the interpolation result in a predetermined area of the buffer memory 110 (S45). In the example shown in FIG. 7, when Tv=4000K, the conversion data obtaining unit 105 obtains the conversion data of a reference illuminant D50 (Tn1=5000K) and that of the reference illuminant A (Tn2=2556K).

$$[Ms] = \{(Tn1 - Tv)/(Tn1 - Tn2)\}[M2] + \{(Tv - Tn2)/(Tn1 - Tn2)\}[M1] \quad (2)$$

where Ms represents the conversion data under the viewing illuminant (Tv);

M1 represents the conversion data under the reference illuminant (Tn1); and

M2 represents the conversion data under the reference illuminant (Tn2), for Tn2<Tv<Tn1

Colorimetric Value Conversion Unit

Figure 11:
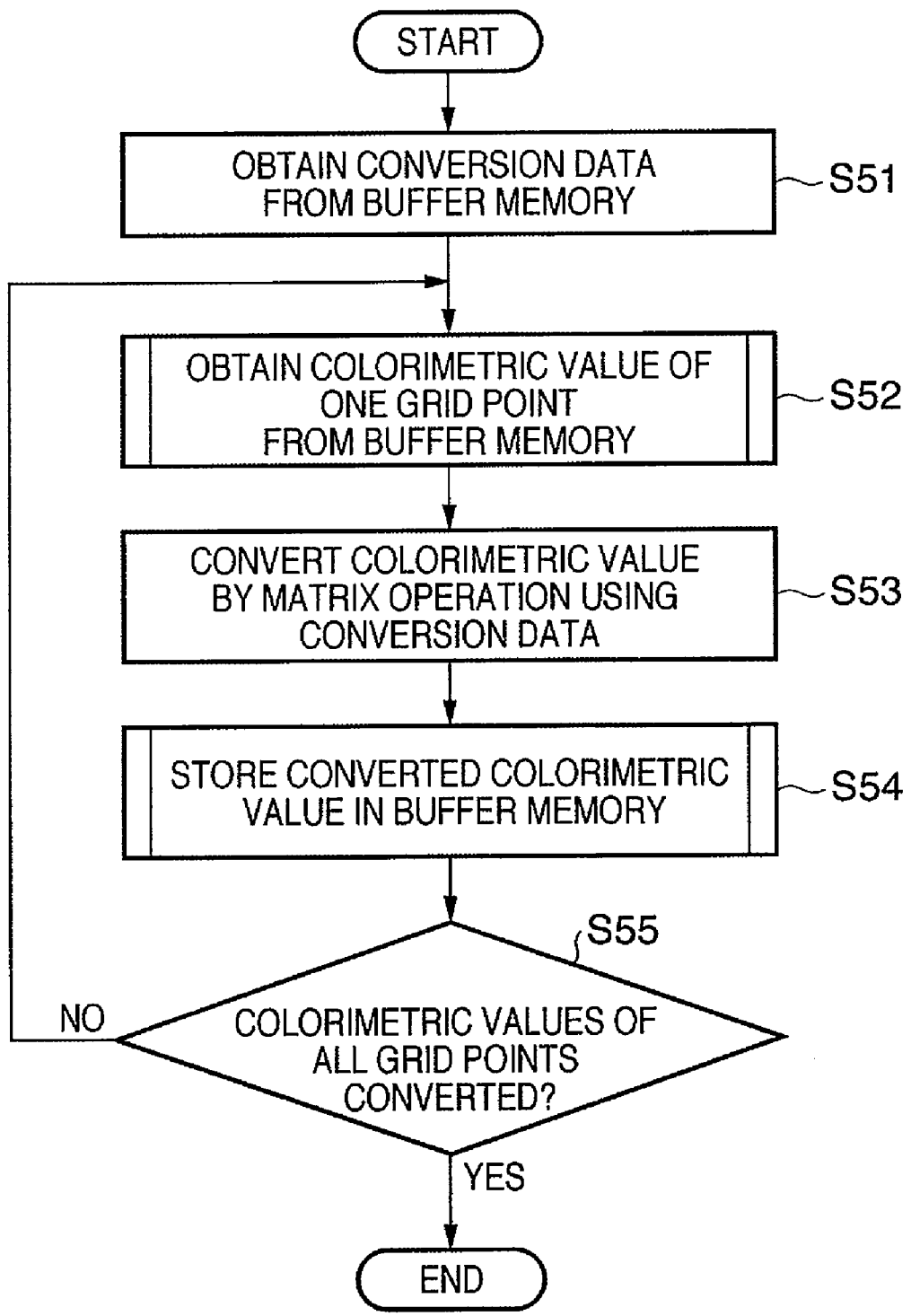
FIG. 11 is a flowchart for explaining the operation of a colorimetric value conversion unit.

FIG. 11 is a flowchart for explaining the operation (S15) of the colorimetric value conversion unit 107.

The colorimetric value conversion unit 107 obtains the conversion data under the viewing illuminant from the buffer memory 110 (S51).

The colorimetric value conversion unit 107 then extracts the CIEXYZ value of one grid point from the colorimetric value stored in the buffer memory 110 (S52), and converts it into the CIEXYZ value of the spectral radiance data by using the matrix operation shown in equation (1) which uses the conversion data (S53). The colorimetric value conversion unit 107 associates the CIEXYZ value as the conversion result with the grid point and stores it in a predetermined area of the buffer memory 110 (S54).

The colorimetric value conversion unit 107 determines whether the CIEXYZ values of all the grid points have been converted (S55), and repeats the processing in steps S52 to S54 until the CIEXYZ values of all the grid points are converted.

In this manner, conversion data for converting the tristimulus values calculated from the spectral reflectance data into those calculated from the spectral radiance data are generated for a plurality of reference illuminants. Then, the colorimetric data (tristimulus values) of the spectrophotometer are converted into colorimetric data (tristimulus values) considering the geometric condition of colorimetry by the spectral radiancemeter, by the matrix operation using the conversion data. When there in no reference illuminant which is equal to the viewing illuminant, the conversion data of the viewing illuminant is interpolated from the conversion data of a reference illuminant having a color temperature close to that of the viewing illuminant.

More specifically, according to the first embodiment, colorimetric data can be converted while considering the viewing illuminant and geometric condition. Accordingly, when the colorimetric data of the spectrophotometer corresponding to the viewing condition such as media characteristics, color material characteristics, or the like is prepared as an input file, it is possible to extremely easily obtain highly accurate colorimetric data which is close to the color appearance under the actual viewing condition. As a result, it is possible to greatly reduce the burden placed on the user when generating a highly accurate profile.

Second Embodiment

Color processing of the second embodiment according to the present invention will be described below. Note that the same components as in the first embodiment are denoted by the same reference numerals in the second embodiment, and a detailed description thereof will be omitted.

[Arrangement of Apparatus]

Figure 12:
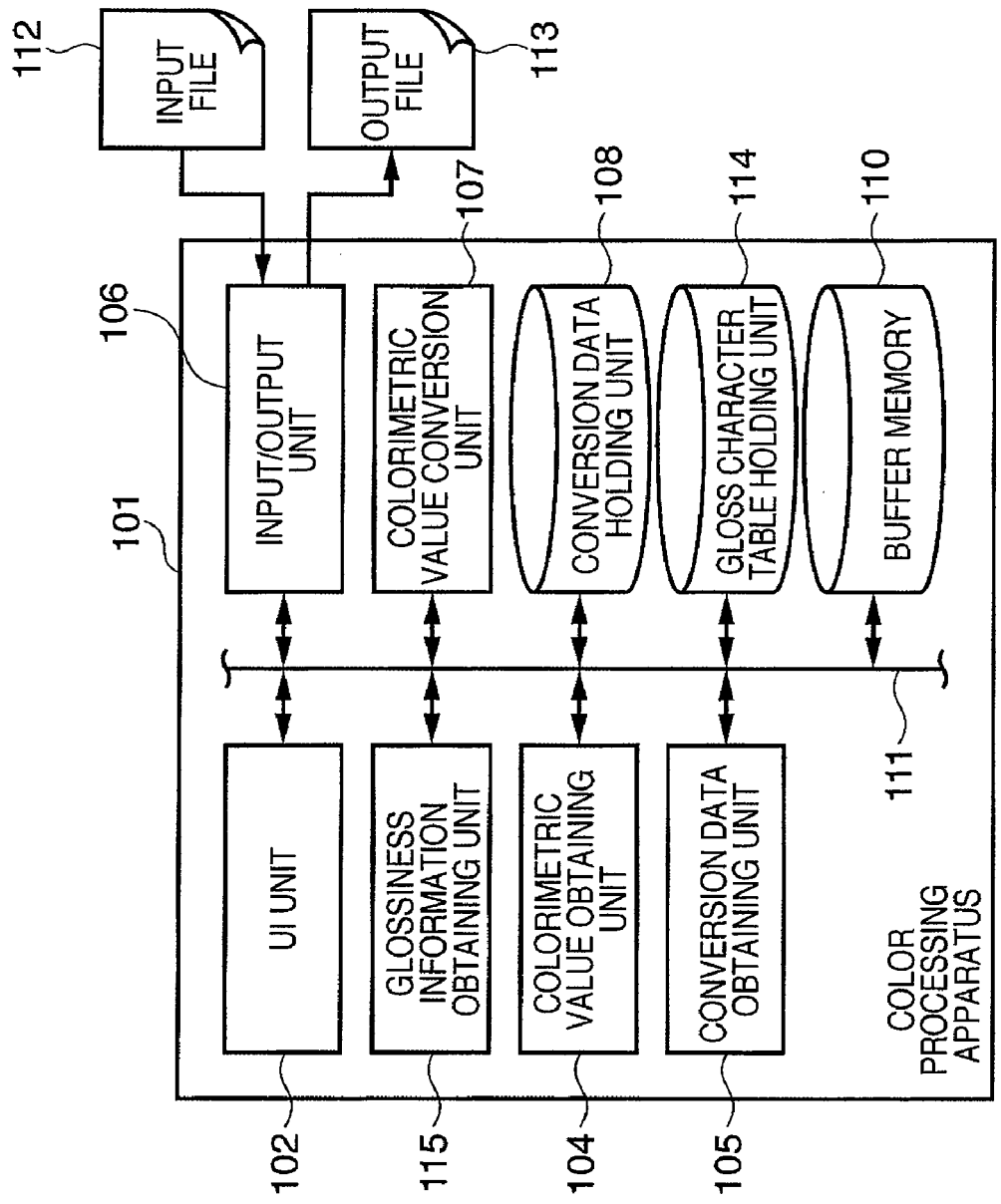
FIG. 12 is a block diagram showing the arrangement of a color processing apparatus of the second embodiment.

FIG. 12 is a block diagram showing the arrangement of a color processing apparatus 101 of the second embodiment. The arrangement of the color processing apparatus 101 is different from that of the first embodiment in that the color processing apparatus 101 comprises a glossiness information obtaining unit 115 and a gloss character table holding unit 114, in place of the illuminant information obtaining unit 103 and the illuminant table holding unit 109.

The glossiness information obtaining unit 115 obtains the glossiness information of a medium designated by the user from the gloss character table holding unit 114. The gloss character table holding unit 114 holds a correspondence table which describes the correspondence between the name or model of a medium and glossiness information.

[Operation of Apparatus]

Figure 13:
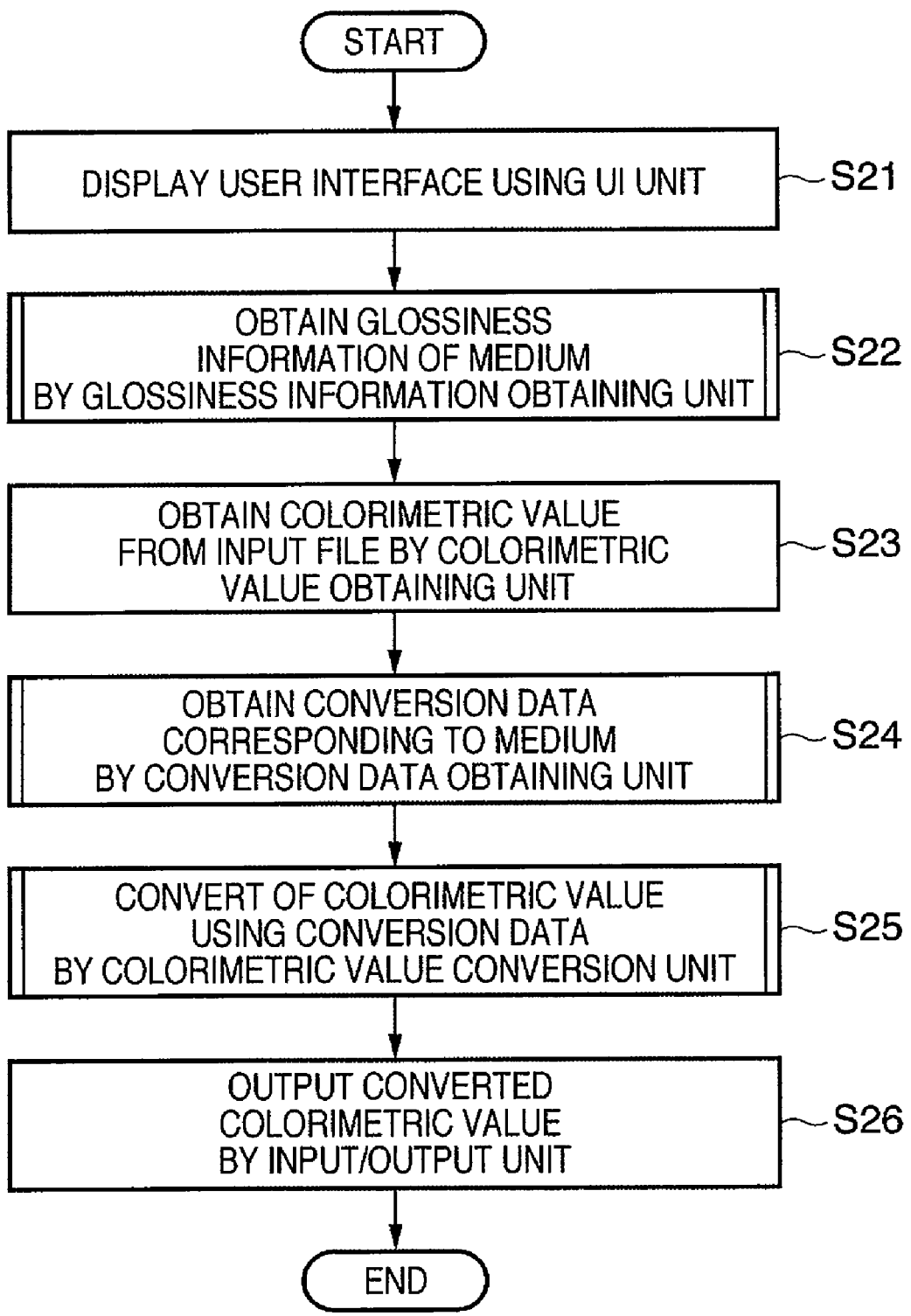
FIG. 13 is a flowchart illustrating the process of the color processing apparatus.

FIG. 13 is a flowchart illustrating the process of the color processing apparatus 101.

A UI unit 102 displays a user interface for a user to input information required to convert a colorimetric value on a monitor (S21).

Figure 14:
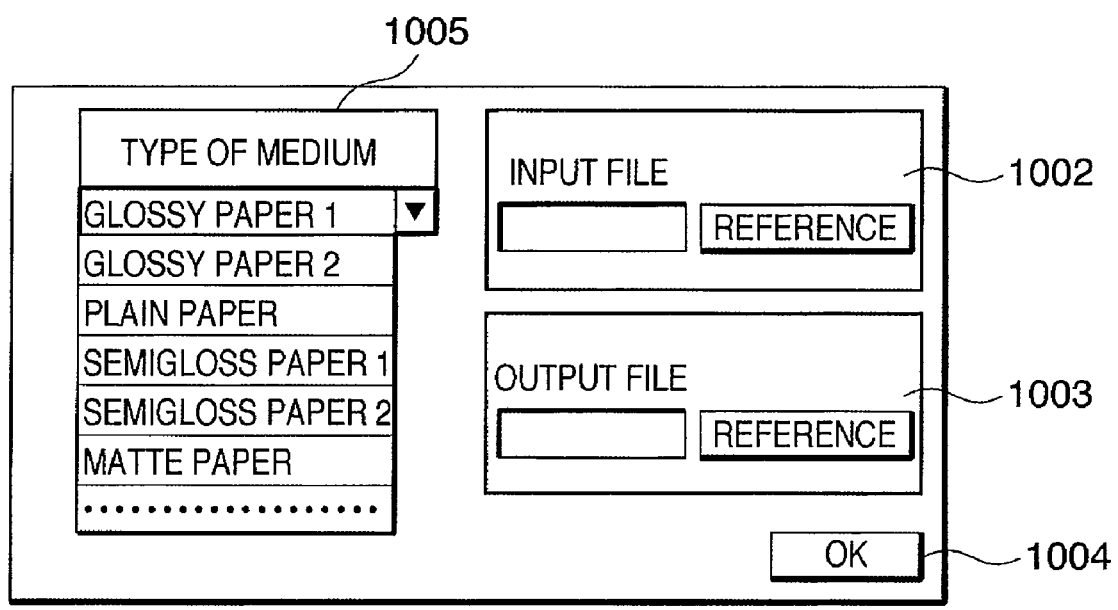
FIG. 14 is a view showing an example of a user interface.

FIG. 14 is a view illustrating an example of the user interface. The user interface of the second embodiment includes a medium setting section 1005 for inputting or selecting the name or model which represents the type of the medium used by the user (medium to be used), in place of the viewing illuminant setting section 1001 shown in FIG. 5. Note that in the pull-down menu of the medium setting section 1005, the general names (glossy paper, plain paper, matte paper, and the like) of media or the models of print sheet vendors can be set.

The glossiness information obtaining unit 115 obtains glossiness information from the gloss character table holding unit 114 based on the name or model of the medium set in the medium setting section 1005 by the user, and stores it in a predetermined area of the buffer memory 110 (S22).

A colorimetric value obtaining unit 104 obtains a colorimetric value (a CIEXYZ value calculated from a spectral reflectance by a spectrophotometer) from an input file 112 set in an input file setting section 1002 by the user, through an input/output unit 106 (S23). The colorimetric value obtaining unit 104 then stores the obtained colorimetric value in a predetermined area of the buffer memory 110.

A conversion data obtaining unit 105 obtains conversion data from a conversion data holding unit 108 based on the glossiness information obtained by the glossiness information obtaining unit 115 (S24).

FIG. 15 is a view showing the example of conversion data held by the conversion data holding unit 108. The conversion data holding unit 108 holds the glossiness information and conversion data for each of a plurality of reference media. As in the first embodiment, the conversion data includes matrix coefficients for the matrix operation expressed by equation (1) for converting the measurement data of the spectrophotometer into that of the spectral radiancemeter.

A colorimetric value conversion unit 107 converts the colorimetric value stored in the buffer memory 110 by the colorimetric value obtaining unit 104, by using the conversion data obtained by the conversion data obtaining unit 105 (S25), as will be described in detail later. The input/output unit 106 describes the colorimetric value converted by the colorimetric value conversion unit 107 in an output file 113 in a predetermined format and outputs the output file 113 in accordance with the setting in an output file setting section 1003 (S26).

Glossiness Information Obtaining Unit

Figure 16:
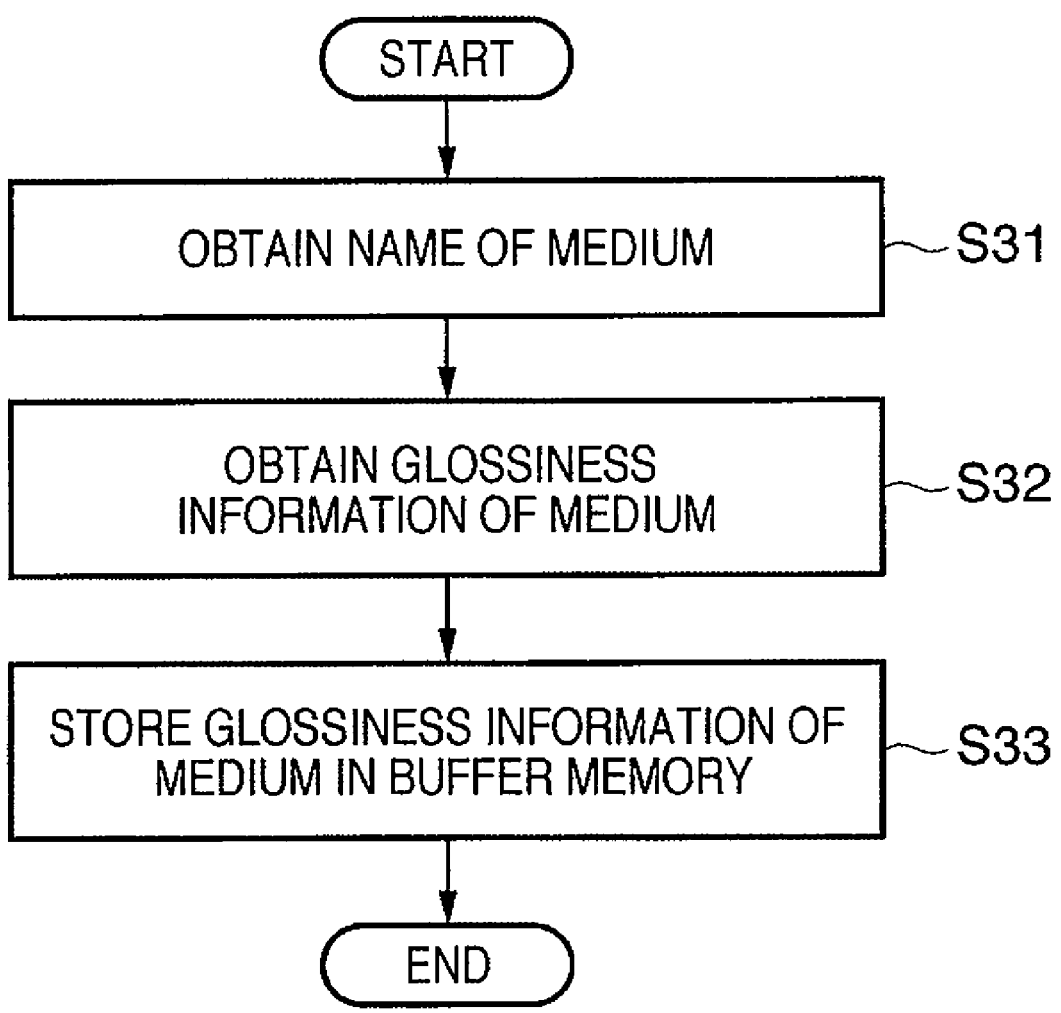
FIG. 16 is a flowchart for explaining the operation of a glossiness information obtaining unit.

FIG. 16 is a flowchart for explaining the operation (S22) of the glossiness information obtaining unit 115.

When an OK button 1004 shown in FIG. 14 is pressed, the glossiness information obtaining unit 115 obtains the name or model of the medium set in the medium setting section 1005 (S31). The glossiness information obtaining unit 115 then obtains glossiness information corresponding to the name or model of the medium from a correspondence table held in the gloss character table holding unit 114 (S32).

FIG. 17 is a view showing an example of the correspondence table held by the gloss character table holding unit 114. The gloss character correspondence table describes glossiness information corresponding to the name or model of the medium listed in the pull-down menu of the medium setting section 1005.

The glossiness information obtaining unit 115 then stores the obtained glossiness information of the medium in a predetermined area of the buffer memory 110 (S33).

Conversion Data Obtaining Unit

Figure 18:
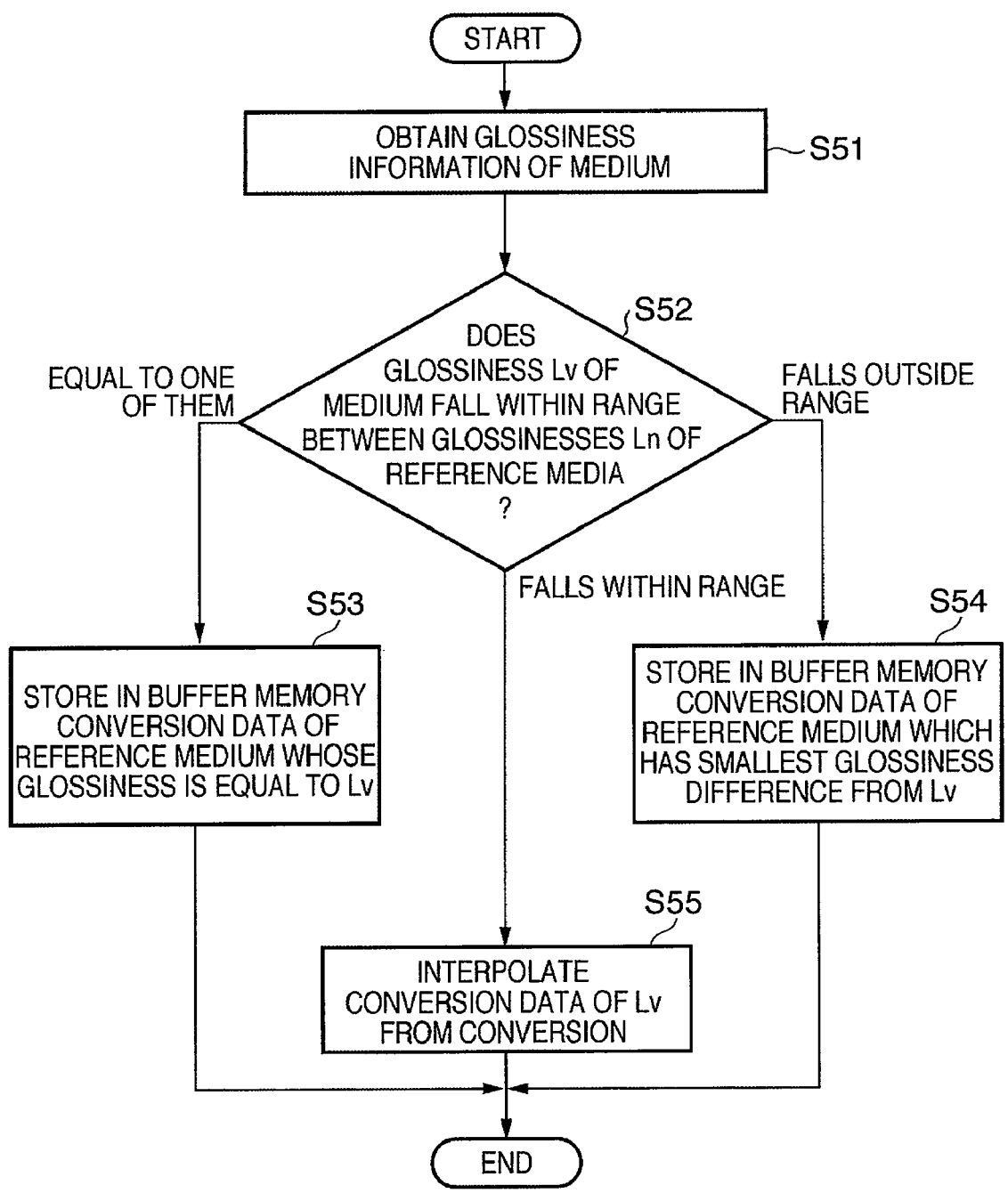
FIG. 18 is a flowchart for explaining the operation of a conversion data obtaining unit.

FIG. 18 is a flowchart for explaining the operation (S24) of the conversion data obtaining unit 105.

The conversion data obtaining unit 105 obtains the glossiness information of the medium from the buffer memory 110 (S51). The conversion data obtaining unit 105 compares a glossiness Lv of the medium with a glossiness Ln of a reference medium of conversion data held by the conversion data holding unit 108, thereby branching the processing (S52).

When there is a reference medium whose glossiness is equal to the glossiness Lv of the medium (Lv=Ln, i.e., Lv is equal to the glossiness of one of the reference media), the conversion data obtaining unit 105 stores the conversion data of that standard medium in a predetermined area of the buffer memory 110 (S53). In the example shown in FIG. 15, when the glossiness Lv of the medium is 30, the conversion data obtaining unit 105 obtains the conversion data of glossy paper 1.

When there is no reference medium whose glossiness is equal to the glossiness Lv of the medium but there are two reference media having glossinesses Ln1 and Ln2, respectively, between which the glossiness Lv falls, the conversion data obtaining unit 105 advances the process to step S55. That is, Ln1<Lv<Ln2 holds in this case, and this is called "within the range" hereinafter.

There may be neither a reference medium with a glossiness equal to the glossiness Lv of the medium nor reference media with glossinesses between which the glossiness Lv falls. That is, Lv<Ln or Ln<Lv holds in this case, and this is called "outside the range" hereinafter. In this case, the conversion data obtaining unit 105 obtains the conversion data of a reference medium whose glossiness is closest to the glossiness Lv, and stores it in a predetermined area of the buffer memory 110 (S54). In the example shown in FIG. 15, when Lv=5, the conversion data obtaining unit 105 obtains the conversion data of matte paper.

When there are reference media having the glossinesses Ln1 and Ln2, respectively, between which the glossiness Lv falls, the conversion data obtaining unit 105 interpolates conversion data by using the linear sum of glossinesses expressed by equation (3) below, based on the glossiness Lv of the medium and the glossinesses Ln1 and Ln2 of the reference media. The conversion data obtaining unit 105 then stores the conversion data of the glossiness Lv as the interpolation result in a predetermined area of the buffer memory 110 (S55). In the example shown in FIG. 15, when Lv=25, the conversion data obtaining unit 105 obtains the conversion data of glossy paper 1 and that of glossy paper 2.

$$[Ms] = \{(Ln1 - Lv)/(Ln1 - Ln2)\}[M2] + \{(Lv - Ln2)/(Ln1 - Ln2)\}[M1] \quad (3)$$

where Ms represents the conversion data of the glossiness (Lv);

M1 represents the conversion data of the glossiness (Ln1); and

M2 represents the conversion data of the glossiness (Ln2), for Ln2<Lv<Ln1

Colorimetric Value Conversion Unit

The operation of the colorimetric value conversion unit 107 is the same as in the first embodiment shown in FIG. 11, and a detailed description will be omitted.

In this manner, conversion data for converting the tristimulus values calculated from the spectral reflectance data into those calculated from the spectral radiance data are generated for a plurality of reference media (having different glossinesses). Then, the colorimetric data (tristimulus values) of the spectrophotometer are converted into the colorimetric data (tristimulus values) considering the geometric condition of colorimetry by the spectral radiancemeter, by the matrix operation using the conversion data. That is, the colorimetric data measured under the first geometric condition of colorimetry is converted into that measured under the second geometric condition of colorimetry. When there is no reference medium having a glossiness equal to that of the medium to be used, the conversion data of the medium to be used is interpolated from the conversion data of a reference medium having a glossiness close to that of the medium to be used.

More specifically, according to the second embodiment, colorimetric data can be converted while considering the glossiness of the medium and geometric condition. Accordingly, when the colorimetric data of the spectrophotometer corresponding to the viewing condition such as a viewing illuminant, color material characteristics, or the like is prepared as an input file, it is possible to extremely easily obtain highly accurate colorimetric data which is close to the color appearance under the actual viewing condition. As a result, it is possible to largely reduce the load of the user in generating a highly accurate profile.

Modification of Embodiments

Viewing Condition

The viewing condition is exemplified by the color temperature of the viewing illuminant in the first embodiment, and by the glossiness of the medium to be used in the second embodiment. However, the viewing condition is not limited to these. For example, various viewing conditions can be used, such as a sharpness, image clarity, or the like other than glossiness as a medium characteristic, the type of color material used to print samples (e.g., color patches), and a geometric condition upon viewing. That is, any parameter can be employed as a viewing condition to be set by the user as long as it serves as a variable factor of conversion data. Of course, the combination of the above-described information can be used as a viewing condition.

Method of Setting Viewing Condition

The first embodiment has exemplified a case in which a light color symbol, reference illuminant, or supplementary reference illuminant is used to select a viewing illuminant. However, an F number, which is a standard for fluorescent lamps defined by Commission Internationale de l'Eclairage (CIE), may also be used. That is, any name or symbol can be used as long as it can specify the type of illuminant.

The second embodiment has exemplified a case in which a medium to be used by the user is selected using the name which represents the type of medium. However, the name of a commercial medium may be registered in advance to select the medium by using its name. That is, any name, model, or symbol can be used as long as it can specify the type of medium.

In the above described embodiments, a user sets the viewing condition. However, the viewing condition may be measured using a measurement device. For example, a sensor may be used to measure the color temperature of the viewing illuminant in the first embodiment, and a glossmeter may be used to measure the glossiness of a medium in the second embodiment.

Format of Conversion Data

Equation (1) executes conversion by using not the spectral radiance and spectral reflectance but a CIEXYZ value calculated from them. The conversion formula and the format of conversion data are not limited to those in equation (1). For example, a coefficient a(λ) and a constant b(λ) shown in equation (4) below may be calculated for each wavelength by using the measurement data of the spectral radiance and spectral reflectance of a plurality of color patches and using the least-squares method or the like, and then a conversion formula for predicting the spectral radiance from the spectral reflectance may be used.

$$S(\lambda) = a(\lambda) \cdot R(\lambda) + b(\lambda) \quad (4)$$

where S(λ) represents the spectral radiance at the wavelength λ; and

R(λ) represents the spectral reflectance at the wavelength λ.

Equation (4) converts the spectral reflectance into the spectral radiance by a linear equation. However, conversion may be executed using a polynomial equation such as:

$$S(\lambda) = \sum_{i=0}^{n} a_i(\lambda) \cdot R_n(\lambda) \quad (5)$$

In other words, any format of conversion data may be used as long as it can convert the spectral reflectance data into the spectral radiance data with an accuracy requested by the user.

Note that the conversion data under the viewing condition in the format of equation (4) is calculated from the obtained viewing condition information and the coefficient a(λ) and constant b(λ) of the linear equation of the standard conversion data, by using the above-described interpolation processing.

Sample for Generating Conversion Data

In the above-described embodiments, the kind of samples for generating conversion data is not particularly limited. For example, when samples are printed by a printer, some or all of white, cyan, magenta, yellow, read, green, blue, and black as the colors of a boundary portion of the color reproduction range (output color gamut) of the printer can be used. In addition, a group of gray scale patches at predetermined intervals of lightness, which respectively pass the respective hue lines ranging from the white point to black point of the output color gamut, may be used as samples.

Interpolation of Conversion Data

In the above-described embodiments, the conversion data of a reference illuminant (medium) is interpolated using the linear sum of color temperatures (glossinesses). However, interpolation is not limited to the use of the linear sum, and it may be executed based on the ratio of distances on a CIEXYZ color space, CIExy chromaticity diagram, or CIEuv chromaticity diagram. Alternatively, interpolation may be executed by using the linear sum of reciprocals of color temperatures (glossinesses).

Conversion Data

In the first embodiment, the conversion data represents matrix coefficients corresponding to a reference illuminant (normalizing illuminant). However, the conversion data is not limited to a normalizing illuminant, and conversion data generated under an illuminant other than a normalizing illuminant may be used. The number of conversion data is not limited to, for example, three as shown in FIG. 7, and a large number of conversion data can be prepared in accordance with reference illuminants (media).

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-117622, filed Apr. 26, 2007, which is hereby incorporated by reference herein in its entirety.

What is claimed is:

1. A color processing apparatus comprising:
a holding section, arranged to hold a plurality of conversion data for converting colorimetric data measured under a first geometric condition of colorimetry into colorimetric data measured under a second geometric condition of colorimetry;
a first obtaining section, arranged to obtain information of a viewing illuminant;
a second obtaining section, arranged to obtain the colorimetric data measured under the first geometric condition of colorimetry;
an interpolator, arranged to interpolate conversion data which corresponds to the information of the viewing illuminant from the plurality of conversion data held by said holding section; and
a converter, arranged to convert the colorimetric data measured under the first geometric condition of colorimetry and obtained by said first obtaining section into the colorimetric data measured under the second geometric condition of colorimetry, using the interpolated conversion data.

2. The apparatus according to claim 1, wherein said holding section holds a plurality of conversion data corresponding to reference illuminants with different color temperatures.

3. The apparatus according to claim 1, wherein the information of the viewing illuminant is color temperature information.

4. The apparatus according to claim 2, wherein when said holding section does not hold conversion data corresponding to a color temperature equal to a color temperature of the viewing illuminant, said interpolator interpolates conversion data which corresponds to the color temperature of the viewing illuminant from conversion data of a color temperature higher than the color temperature of the viewing illuminant and conversion data of a color temperature lower than the color temperature of the viewing illuminant.

5. The apparatus according to claim 1, wherein the colorimetric data measured under the first geometric condition of colorimetry is measurement data measured using a spectrophotometer, and the colorimetric data measured under the second geometric condition of colorimetry is measurement data measured using a spectral radiancemeter.

6. A color processing apparatus comprising:
a first holding section, arranged to hold glossiness information corresponding to a type of medium;
a second holding section, arranged to hold conversion data for converting colorimetric data regarding a spectral reflectance into colorimetric data regarding a spectral radiance;
an input section, arranged to input a user's instruction which indicates a type of medium to be used and a source of colorimetric data;
a first obtaining section, arranged to obtain glossiness information of the medium to be used from said first holding section based on the user's instruction;
a second obtaining section, arranged to obtain the colorimetric data regarding the spectral reflectance based on the user's instruction;
a third obtaining section, arranged to obtain conversion data from said second holding section based on the glossiness information of the medium to be used; and
a converter, arranged to convert the colorimetric data obtained by said second obtaining section using the conversion data obtained by said third obtaining section.

7. The apparatus according to claim 6, wherein said second holding section holds a plurality of conversion data corresponding to reference media with different glossinesses.

8. The apparatus according to claim 6, wherein said third obtaining section obtains conversion data corresponding to the glossiness of the medium to be used, based on the glossiness information of the medium to be used and the glossiness information of the reference medium.

9. The apparatus according to claim 8, wherein when there is no reference medium with a glossiness equal to the glossiness of the medium to be used, said third obtaining section interpolates conversion data which corresponds to the glossiness of the medium to be used from conversion data of a reference medium with a glossiness higher than the glossiness of the medium to be used and conversion data of a reference medium with a glossiness lower than the glossiness of the medium to be used.

10. The apparatus according to claim 6, wherein said converter converts the colorimetric data regarding the spectral reflectance into colorimetric data considering a geometric condition upon measurement of the spectral radiance, using the conversion data.

11. A color processing method comprising:
using a processor to perform the steps of:
holding a plurality of conversion data for converting colorimetric data measured under a first geometric condition of colorimetry into colorimetric data measured under a second geometric condition of colorimetry;
obtaining information of a viewing illuminant;
obtaining the colorimetric data measured under the first geometric condition of colorimetry;
interpolating conversion data which corresponds to the information of the viewing illuminant from the plurality of conversion data held in the holding step; and
a converter, arranged to convert the colorimetric data measured under the first geometric condition of colorimetry and obtained in the first obtaining step into the colorimetric data measured under the second geometric condition of colorimetry, using the interpolated conversion data.

12. A color processing method comprising:
using a processor to perform the steps of:
holding glossiness information corresponding to a type of medium;
holding conversion data for converting colorimetric data regarding a spectral reflectance into colorimetric data regarding a spectral radiance;
inputting a user's instruction which indicates a type of medium to be used and a source of colorimetric data;
obtaining glossiness information of the medium to be used from the glossiness information held in the first holding step, based on the user's instruction;
obtaining the colorimetric data regarding the spectral reflectance based on the user's instruction;
obtaining conversion data from the conversion data held in the second holding step, based on the glossiness information of the medium to be used; and
converting the colorimetric data obtained in the second obtaining step using the conversion data obtained in the third obtaining step.

13. A non-transitory computer-readable medium storing a computer executable program for causing a computer to implement a color processing apparatus according to claim 1.

14. A non-transitory computer-readable medium storing a computer executable program for causing a computer to implement a color processing apparatus according to claim 6.

* * * * *